Dec. 10, 1957  O. MAXIMILIAN  2,815,812
GUIDE MECHANISM
Filed Sept. 27, 1954  2 Sheets-Sheet 1
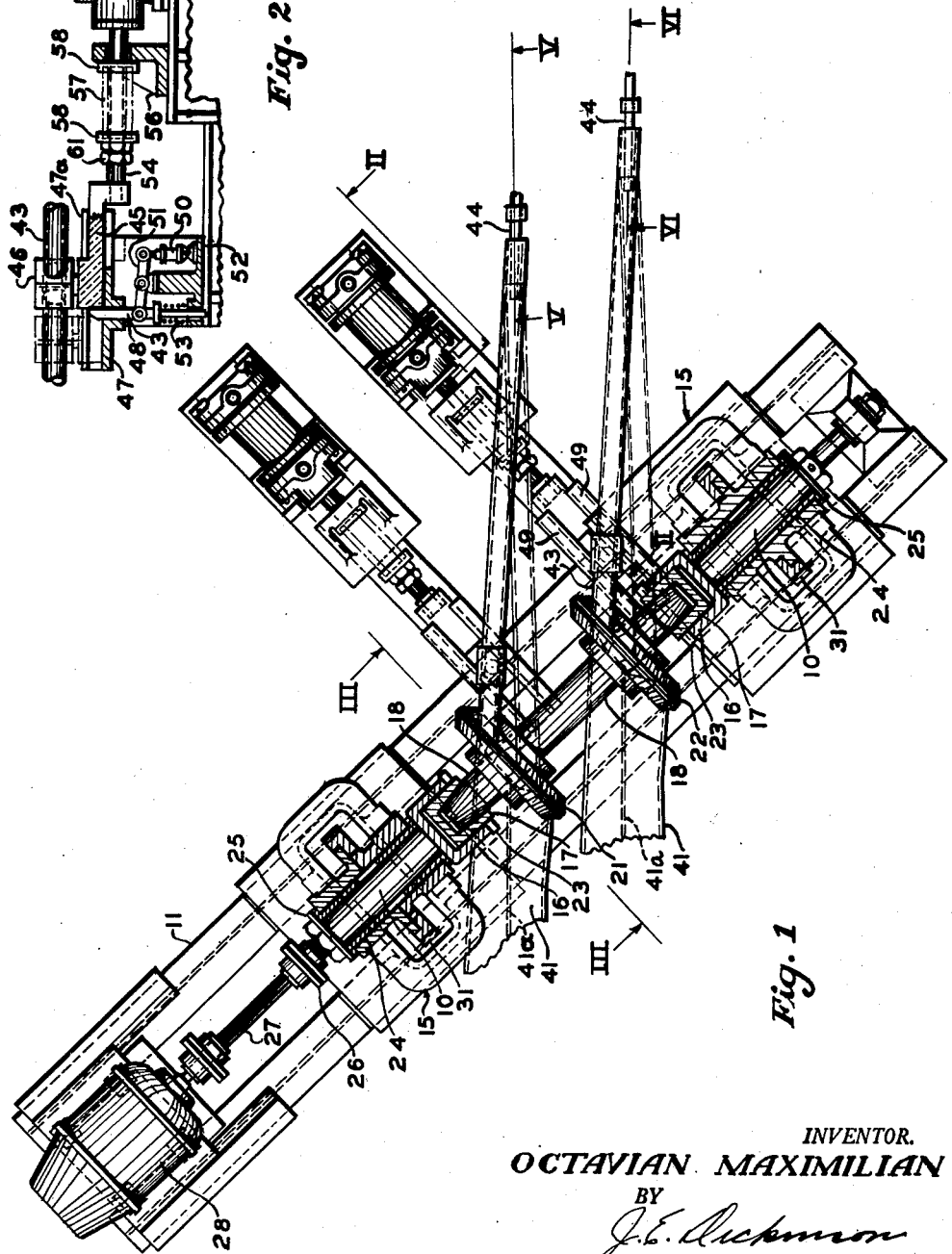
INVENTOR.
OCTAVIAN MAXIMILIAN
BY
HIS ATTORNEY Dec. 10, 1957     O. MAXIMILIAN     2,815,812
GUIDE MECHANISM
Filed Sept. 27, 1954     2 Sheets-Sheet 2
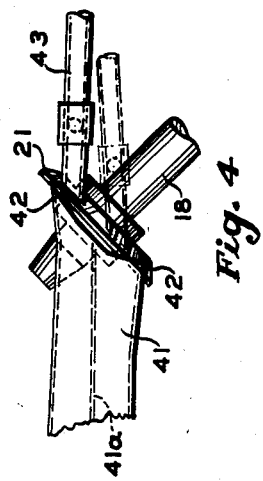
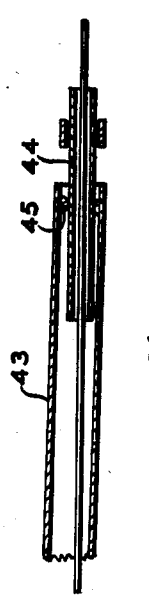
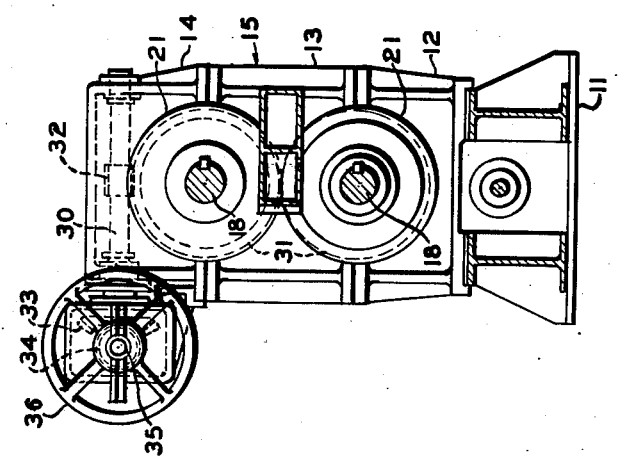
INVENTOR.
OCTAVIAN MAXIMILIAN
BY
HIS ATTORNEY

United States Patent Office 2,815,812
Patented Dec. 10, 1957

2,815,812

GUIDE MECHANISM

Octavian Maximilian, Brentwood, Pa., assignor to United Engineering and Foundry Company, Pittsburgh, Pa., a corporation of Pennsylvania Application September 27, 1954, Serial No. 458,468

12 Claims. (Cl. 164—61)

This invention relates to a guiding mechanism and particularly to a guide for conveying a rapidly moving workpiece such as a rod or bar in a sideways direction between a pair of rotary shear knives for dividing the rod or bar in two parts in such a fashion as to permit the front portion to be directed to one receiving station and the remaining portion to be conveyed in a different direction to a separate receiving station.

In the recent developments of high speed rolling mills, particularly mills for the production of rod and bar stock, the delivery speed of the material may well exceed 6,000 feet per minute, in which case in the dividing thereof there is encountered serious difficulty both in the shearing of the rod or bar and in the guiding of the remaining or trailing portion thereof as it issues from the shear proper. The dividing of rods to form smaller coils is critical even in lower speed mills inasmuch as the guiding mechanism used with dividing shears has been responsible for much loss in time and expense by reason of the frequent cobbles that are formed. In the development of the present invention it has been recognized that the difficulty heretofore experienced is primarily due to the differential speed relationship normally existing between the guide in its transverse movement to direct the stock to the shears, the peripheral speed of the knives, and the forward speed of the material to be cut. If the guide employed for switching the material into engagement with the knives is not moving at a speed at least equal to or greater than the peripheral speed of the knives, it will tend to retard the transverse movement of the remaining portion of the rod momentarily whereby the rod, traveling at such a tremendous forward speed, will pile up and cobble before the shear. This condition does not only mean loss of the entire rod or rods but also may cause damage to the machinery as well as injury to the workmen.

It is therefore an object of this invention to provide a guide for use in conjunction with a pair of cooperative shear blades for conveying and directing the material from a position out of engagement with the blades to a position into engagement therewith to cause the material to be sheared.

It is another object of this invention to provide a guide which terminates at a point closely adjacent the shearing edge of the shear blades and which moves in a direction parallel to the plane containing the shearing edges of the blades.

It is still another object of this invention to provide a guide in combination with means for instantaneously moving the guide transversely from one side of the shear blades to the other side at a speed not exceeding the peripheral speed of the blades.

It is a further object of this invention to provide mechanism for instantaneously moving a guide comprising a readily releasable locking means cooperative with a guide which, on its release, will permit the guide to be thrust horizontally in a path parallel to a plane containing the shearing edges of the blades and from the entry to the delivery side thereof.

It is still a further object of this invention to provide a rapidly movable guide which will be inexpensive to manufacture and maintain and highly effective in operation.

These objects, as well as various other novel features and advantages of this invention, will become apparent from the following description and accompanying drawings of which:

Figure 1 is a general plan sectional arrangement of a shear employing two sets of cooperative blades and complementary guides for serving each pair of blades;

Figure 2 is a sectional view taken on lines II—II of Figure 1;

Figure 3 is a sectional view taken on lines III—III of Figure 1;

Figure 4 is a partial plan view, from which the top blade and certain other parts have been removed in order to show the relationship of the entry and the delivery guides more clearly;

Figure 5 is a sectional view taken on lines V—V of Figure 1 showing the position of the rod when the guide is in its initial position, and Figure 6 is a similar vew taken on lnes VI—VI of Figure 1 showing the position of the rod after the guide has been moved to the other side of the shear blades.

With reference to Figure 1, there is shown therein a pair of rotary flying shears employing disc or circular type blades which are arranged in conjunction with two rod or bar mill lines. Each shear, as shown in Figures 1 and 3, consists of a base 11 on which there is mounted a number of frames 12, 13 and 14, which serve to make up two separate gear housings 15 spaced apart along the base 11. Each housing 15 is adapted to receive two spaced apart shafts 10 the axes of each set of which are contained within the same vertical plane. The inner ends of the shafts are enlarged and bored out to form an annular adaptor 16 into which a chock 17 is received and slidably connected to the adaptor 16 by means of a key, not shown. Each chock 17 in turn receives the tapered end of a shaft 18 which is keyed thereto, the main portions of the shafts 18 carrying two pairs of spaced apart circular blades 21 and 22, each pair being mounted directly opposite each other in a shearing relationship and affixed to their respective shafts 18 by means of a tapered key, not shown. In order to provide for horizontal adjustment of the blades relative to each other the outer annular surface of the chock 17 is threaded to receive a nut 23. By turning the nuts 23 the respective shafts 18 are caused to move laterally to the right or to the left as desired. As shown in Figure 1 the shafts 10 are rotatably received in bushings 24 and their outer ends are threaded to receive a lock nut and washer assembly 25. The ends of the shafts, however, extend beyond the lock nut and washer assemblies and are secured by couplings 26 to drive shafts 27 which are connected to and driven by suitable motors 28. The motors 28 are mounted on the base 11 directly above one another and at an elevation whereby their shafts are in direct alignment with the shafts 27 to which they are connected.

The shafts 10, as shown in Figures 1 and 3, are concentric with respect to the bushings 24 and upon the bushings there are eccentrically mounted gears 31. The gears 31 are arranged in pairs, in which the gears of each pair are in meshing relationship for the purpose of adjustment of the shear blades. Each gear 31 is engaged by a worm gear 32 mounted on shaft 30 on one end of which there is provided a bevel gear 33 for engaging a mating gear 34 mounted on a line shaft 35 which is rotated by means of a hand wheel 36. By rotating the hand wheel 36, vertical adjustment of the blades is accomplished and thus the proper cutting relationship of the top and bottom blades of each pair is always maintained even though the blades are reduced in diameter either by wear or redressing.

With reference to Figure 1, it will be observed that for each cooperative pair of blades 21 and 22 there is provided at the delivery side thereof a stationary rectangular-shaped guide 41 made up of two sections, having a dividing partition 41a, which serves to convey the rod to one of two coiling stations. As shown, the partition 41a is cut back from the end thereof thereby to eliminate any interference with the ends of the workpieces during and on the completion of the shearing operation. Attention is directed to Figure 4 in which there are shown the details of the guides adjacent to the shear blades. The movable guide 43 is so mounted that the delivery end thereof, during movement, is maintained closely adjacent to the blades 21 and the stationary guides are so formed as to provide corners 42 which project somewhat beyond the cutting line of the blades. Here again the end of the guide 43 adjacent to the blades is brought to a position as close to the cutting edge as is mechanically reasonable and the ends thereof are arranged parallel to the cutting edge of the blades. By this arrangement the distance between the adjacent ends of the guides 41 and 43 is maintained at a minimum thereby reducing the space across which no support is provided and through which the remaining portion of the sheared rod must travel between the guides which space, as heretofore mentioned, is very critical in high speed mills.

As shown, guide 43 is in the form of a hollow tube adapted to telescopically receive a smaller diameter stationary delivery guide 44 which communicates with the delivery end of the mill. The guide 43 is of sufficient width for the purpose of providing clearance for the rod as it is engaged by the blades and possibly thrown sideways within the guide during shearing. In accordance with Figure 2, the guide 43 passes through a sleeve 46 mounted on a slidable block 45 and to which the guide is secured. To restrict or maintain the path of the block 45 parallel to a plane containing the cutting edges of the shear blades, the block is slidably mounted in a guide box 47 having a pair of walls 47a between which the block 45 slides. The solid portion of the bottom of the guide 47 is provided with an opening 48 into which there is received a projecting locking pin 49 for engagement with the front end surface of the block 45. The pin 49 is pivotally mounted on one end of a lever 51 and at the opposite end of the lever there is pivotally connected a piston-cylinder assembly 50. The lower end of the pin 49 is slidably retained in an opening in a sub-base 52, which sub-base supports the pin operating mechanism, and is normally forced upwardly by means of a spring 53 which surrounds the lower extended portion of the pin 49. As shown in Figure 2 one end of the block 45 is secured to the rod 54 of a reversible heavy duty piston-cylinder assembly 55 which is in line with block 45 and supported also by the sub-base 52. The cylinder rod 54 passes through an opening in a stand 56 supported by base 52 and between the stand 56 and the block 45 there is a high compression spring 57 which surrounds the rod. The opposite ends of the spring 57 are engaged by a pair of washers 58 also carried by the rod 54, an adjustment for varying the initial compression of the spring being provided in the form of nuts 61 threaded upon the rod. In this way the speed of the guide 43 as it is shifted from one side to the other can be either increased or decreased so as not to exceed the peripheral speed of the blades. The cylinder 55 is of the double-acting heavy duty type having large ports therein so that when the cylinder is immobilized there will be no opposition to the movement of the guide when the spring 57 is released.

The operation of the present invention may be briefly described as follows: For the sake of illustration the operation of only one of the guide mechanisms will be explained. Assuming that the movable guide 43 is on the left side of the center line of the blade 21, the spring 57 compressed by the piston-cylinder assembly 55, the locking pin 49 raised into locking engagement with the front surface of the block 45 and the piston-cylinder assembly immobilized by cutting off the high compression fluid therefrom. The workpiece issues from the last mill stand, passes through the stationary and movable guides 44 and 43 and enters the left section of the delivery guide 41 and will be conveyed to the coiling reel communicating with that section of the guide. When the desired length of rod has passed through the guide 43, the cylinder 52 is immediately actuated to withdraw the locking pin 49 thereby to release the block 45. The compressive force of the spring 57 will thrust the guide 43 from its position on one side of the blades 21 to the opposite side thereof and thereby cause the rod to be sheared by the blades 21 and the leading end of the sheared trailing end portion to be directed across the partition 41a and into the adjacent guide opening. As mentioned heretofore, the peripheral speed of the blades may be equal to or somewhat greater than the speed of the guide carrying the rod between the shear blades so that the shear blades during the cutting actually assist in the passage of the rod between the shears and prevents cobbling inasmuch as the forward component of speed of the shear blades is also equal to or greater than the forward speed of the rod. Since the delivery end of guide 43 is in close communication with the entry end of guide 41 and as the delivery end of guide 43 is moved in a path parallel to the plane of the shear blades, and at a speed not exceeding thet peripheral speed thereof, the possibility of cobbling at the shear is eliminated and the leading end of the sheared trailing portion of the rod is readily carried without interference beyond the partition 41a and into the adjacent opening of guide 41 and to the coiler provided therefor.

Although no particular controls have been specifically set forth and described for the various guide operating mechanisms illustrated and provided herein, inasmuch as they form no particular part of the invention herein disclosed and claimed, such controls may be either of the manual type operable by the workman in attendance to effect actuation of the guide mechanism or there may be provided an electric eye control system operable to permit the guide mechanism to function and the rod to be sheared and transferred as soon as a measured length of rod has passed through the guide 43 to the first coiling station.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A workpiece guide switch for use in combination with a shear having at least one set of cooperative circular blades arranged in a vertical oblique plane with respect to the path of travel of workpieces to be sheared comprising a movable extendable guide terminating at a point closely adjacent to the cutting edge of said blades, means for extending and retracting said movable guide thereby to maintain the delivery end of said guide adjacent to said blades in a path parallel to the vertical plane of said blades and for moving the guide and the workpiece at a velocity in the plane of the blades substantially equal to the peripheral speed of said blades during the interval of shearing.

2. A guide switch for use in combination with a shear having at least one set of cooperative circular blades arranged in a vertical oblique plane with respect to the path of the material to be sheared comprising a stationary guide terminating at a point closely adjacent the shearing edge of and on the delivery side of said blades and adapted to receive a sheared portion of material issued from said shear, a movable guide having the delivery end thereof formed on a bias and terminating at a point closely adjacent to the cutting edge of said blades and through which a workpiece is directed, means for restricting the movement of the delivery end of said movable guide in a path parallel to the vertical plane of said blades, power means connected to said restricting means, compression means associated with said power means, means for maintaining said compression means in a state of compression and to release said compression means selectively to thrust said movable guide and material confined therein through the shearing zone of the blades at a velocity in the plane of said blades substantially equal to the peripheral velocity of said blades thereby to shear the workpiece passing through the shear and to direct the remaining portion thereof to said stationary guide.

3. A guide switch for use in combination with a shear having at least one set of cooperative circular blades arranged in a vertical oblique plane with respect to the path of the material to be sheared comprising a stationary guide terminating at a point closely adjacent the shearing edge of and on the delivery side of said blades and adapted to receive a sheared portion of material issued from said shear, a movable guide having the delivery end thereof formed on a bias and terminating at a point closely adjacent to the cutting edge of said blades and through which a workpiece is directed, means for restricting the movement of the delivery end of said movable guides in a path parallel to the vertical plane of said blades, power means including a rod connected to said last mentioned means, compression means mounted on said connecting rod, means engaging said compression means mounted on said rod between which said compression means is compressed by the actuation of said power means, means for maintaining said compression means in a state of compression and means to release said compression means selectively to thrust said movable guide and material confined therein from one transverse side of the blades to the opposite side and at a velocity in the plane of said blades substantially equal to the peripheral velocity of said blades thereby to shear said workpiece and to direct the remaining portion thereof into said stationary guide.

4. A guide switch for use in combination with a shear having at least one set of cooperative circular blades arranged in a vertical oblique plane with respect to the path of the material to be sheared comprising a stationary guide terminating at a point closely adjacent the shearing edge of and on the delivery side of said blades and adapted to receive the remaining sheared portion of material issuing from said shear, a movable guide having the delivery end thereof formed on a bias and terminating at a point closely adjacent to the cutting edge of said blades and through which a workpiece is directed, means for restricting the movement of the delivery end of said movable guide in a path parallel to the vertical plane of said blades, power means including a connecting rod connected to said last mentioned means, compression means mounted on said connecting rod, means engaging said compression means mounted on said rod and between which said compression means is compressed by the actuation of said power means, a locking means adapted to engage with said restricting means when in its retracted position and means for releasing said locking means thereby to permit said compression means to expand and to thrust said movable guide and workpiece confined therein from one transverse side of the blades to the opposite side at a velocity in the plane of the blades substantially equal to the peripheral velocity of said blades thereby to shear the workpiece passing therethrough and to direct the remaining portion thereof to said stationary guide.

5. A guide switch for use in combination with a shear having at least one set of cooperative circular blades arranged in a vertical oblique plane with respect to the path of the workpiece to be sheared comprising a stationary guide terminating at a point closely adjacent the shearing edge of and on the delivery side of said blades and adapted to receive a sheared portion of the workpiece issuing from said shear, a movable guide having the delivery end thereof formed on a bias and terminating at a point closely adjacent to the cutting edge of said blades, means for restricting the movement of the delivery end of said movable guide in a path parallel to the vertical plane of said blades, a power means including a rod connected to said last mentioned means, compression means mounted on said connecting rod, means engaging said compression means mounted on said connecting rod and between which said compression means is compressed by the actuation of said power means, a locking means adapted to engage with said restricting means when in its retracted position and means for releasing said locking means thereby to permit said compression means to expand and to thrust said movable guide and workpiece confined therein from one transverse side of the blades to the opposite side at a velocity in the plane of the blades at least equal to the peripheral velocity of said blades thereby to shear the workpiece passing therethrough and to direct the remaining portion thereof into said first mentioned stationary guide.

6. A guide switch for use in combination with a shear having at least one set of cooperative circular blades arranged in a vertical oblique plane with respect to the path of the material to be sheared comprising a stationary guide terminating at a point closely adjacent the shearing edge of and on the delivery side of said blades and adapted to receive a sheared portion of material issued from said shear, a movable guide having the delivery end thereof formed on a bias and terminating at a point closely adjacent to the cutting edge of said blades and through which a workpiece is directed, said delivery end being adapted to move parallel to said cutting edge, a sliding block operatively connected to said movable guide, means for restricting movement of said block to a path parallel to the vertical plane of said blades, power means including a connecting rod connected to said block, a compression means carried by said connecting rod adapted to be compressed on actuation of said power means, a locking means adapted to engage with said block when in its retracted position and means for releasing said locking means thereby to permit said compression means to expand and to thrust said movable guide and workpiece confined therein from one transverse side of the blades to the opposite side at a velocity in the plane of the blades at least equal to the peripheral velocity of said blades thereby to shear the workpiece passing therethrough and to direct the remaining portion thereof into said first mentioned stationary guide.

7. A guide switch for use in combination with a shear having at least one set of cooperative circular blades arranged in a vertical oblique plane with respect to the path of the material to be sheared comprising a stationary guide terminating at a point closely adjacent the shearing edge of and on the delivery side of said blades and adapted to receive a sheared portion of a workpiece issued from said shear, a movable guide having the delivery end thereof formed on a bias and terminating at a point closely adjacent to the cutting edge of said blades and through which a workpiece is directed, said delivery end being adapted to move parallel to said cutting edge, a sliding block operatively connected to said movable guide, means for restricting movement of said block in a path parallel to the vertical plane of said blades, a piston cylinder assembly connected to said block, compression means mounted on the rod of said cylinder, stationary and adjustable means for engaging said compression means mounted on said rod and between which said compression means is compressed by the actuation of said cylinder, a locking means adapted to engage with said block when in its retracted position and means for releasing said locking means thereby to permit said compression spring to expand and to thrust said movable guide and workpiece confined therein from one transverse side of the blades to the opposite side at a velocity in the plane of said blades at least equal to the peripheral velocity of said blades thereby to shear the workpiece passing therethrough and to direct the remaining portion thereof into said first-mentioned stationary guide.

8. A guide switch for use in combination with a shear having at least one set of cooperative circular blades arranged in a vertical oblique plane with respect to the path of the material to be sheared comprising a stationary guide terminating at a point closely adjacent the shearing edge of and on the delivery side of said blades and adapted to receive a sheared portion of a workpiece issued from said shear, a movable guide having the delivery end thereof formed on a bias and terminating at a point closely adjacent to the cutting edge of said blades and through which a workpiece is directed, said delivery end being adapted to move parallel to said cutting edge, a sliding block operatively connected to said movable guide, guides engaging said block for maintaining movement thereof in a path parallel to the vertical plane of said blades, a piston-cylinder assembly connected to said block, a spring mounted on the rod of said piston, stationary and adjustable spring engaging means mounted on said rod and between which said spring is compressed by the actuation of said piston-cylinder assembly, a locking means comprising an upwardly projecting releasable pin adapted to engage the front surface of said block when in its retracted position and means for releasing said pin thereby to permit said spring to expand and to thrust said movable guide and material confined therein from one transverse side of the blades to the opposite side at a velocity in the plane of said blades at least equal to the peripheral velocity of said blades thereby to shear the workpiece passing therethrough and to direct the remaining portion thereof into said first-mentioned stationary guide.

9. A guide switch for use in combination with a shear having at least one set of cooperative circular blades with their cutting surfaces arranged in a vertical oblique plane with respect to the path of the material to be sheared comprising a stationary guide terminating at a point closely adjacent the shearing edge of and on the delivery side of said blades and adapted to receive a sheared portion of material issued from said shear, a second stationary guide on the opposite side of said blades, a movable guide telescopically communicating with said second stationary guide and with the delivery end thereof formed on a bias and terminating at a point closely adjacent to the cutting edge of said blades and through which a workpiece is normally passed and initially introduced into said second stationary guide, said delivery end being adapted to be moved parallel to said cutting edge, a sliding block operatively connected to said movable guide, guides engaging said block and maintaining movement thereof in a path parallel to the vertical plane of said blades, a piston-cylinder assembly connected to said block, a spring mounted on the rod of said cylinder, stationary and adjustable spring engaging means mounted on said rod and between which said spring is compressed by the actuation of said piston-cylinder, a locking means comprising an upwardly projecting releasable pin adapted to engage with the front surface of said block when in its retracted position and means for releasing said pin thereby to permit said spring to expand and to thrust said movable guide and workpiece confined therein from one transverse side of the blades to the opposite side at a velocity in the plane of said blades at least equal to the peripheral velocity of said blades thereby to shear the workpiece passing therethrough and to direct the remaining portion thereof into said first-mentioned stationary guide.

10. A guide switch for use in combination with a shear having at least one set of cooperative circular blades with their cutting edges arranged in a vertical oblique plane with respect to the path of the material to be sheared comprising a stationary guide defining two separate sections terminating at a point closely adjacent the shearing edge and on the delivery side of said blades and adapted to receive a sheared portion of material issued from said shear, a second stationary guide on the opposite side of said blades into which material is initially introduced, a movable guide intermediate said shear and second stationary guide telescopically communicating with said second stationary guide, the delivery end of said movable guide being formed on a bias and terminating at a point closely adjacent to the cutting edge of said blades and adapted to be moved parallel to said cutting edge, a sliding block operatively connected to said movable guide, guides engaging said block and for maintaining the movement thereof in a path parallel to the vertical plane of said blades, a piston-cylinder assembly connected to said block, a spring mounted on the rod of said cylinder, spring engaging means mounted on said rod and between which said spring is compressed by the actuation of said piston-cylinder and including adjustable means for controlling the compression of said spring, a locking means comprising an upwardly projecting releasable pin adapted to engage the front surface of said block when in its retracted position and means for releasing said pin thereby to permit said spring to expand and to thrust said movable guide and workpiece confined therein from one transverse side of the blades to the opposite side at a velocity in the plane of said blades at least equal to the peripheral velocity of said blades thereby to shear the workpiece passing therethrough and to direct the remaining portion thereof into the other section of said first mentioned stationary guide.

11. A guide switch for use in combination with a shear having at least one set of cooperative circular blades with their cutting edges arranged in a vertical oblique plane with respect to the path of the workpiece to be sheared comprising a stationary guide terminating at a point closely adjacent to the shearing zone and on the delivery side of said blades and adapted to receive a sheared portion of material issued from said shear, said guide having projecting end portions extending from one side through and beyond the cutting line of the blades, a movable extendable guide terminating at a point closely adjacent to the cutting edge of said blades, means for extending and retracting said movable guide thereby to maintain the delivery end of said guide adjacent to said blades in a path parallel to the vertical plane of said blades and for moving the guide and the workpiece at a velocity in the plane of the blades substantially equal to the peripheral speed of said blades during the interval of shearing.

12. A guide switch according to claim 11 in which the movable guide includes a tubular extendable portion terminating on a bias at the delivery end thereof parallel to the oblique plane containing the shear blade cutting edges and at a point closely adjacent to the cutting edge of the shear blades and extendable generally in the direction of the path of travel of the workpiece.

References Cited in the file of this patent

UNITED STATES PATENTS

| | | |
|---|---|---|
| 2,170,255 | Sheperdson | Aug. 22, 1936 |
| 2,621,734 | Morgan et al. | Dec. 16, 1952 |
| 2,694,448 | Petersen | Nov. 16, 1954 |